(12) United States Patent
Lin

(10) Patent No.: US 6,817,088 B1
(45) Date of Patent: Nov. 16, 2004

(54) TERMINATION METHOD FOR THICK FILM RESISTANCE HEATER

(75) Inventor: Hongy Lin, Chesterfield, MO (US)

(73) Assignee: Watlow Electric Msg.C, Saint Louis ( * ) Notice: Subject to any disclaimer, the term of this patent is extended or adjusted under 35 U.S.C. 154(b) by 194 days.

(21) Appl. No.: 09/595,951

(22) Filed: Jun. 16, 2000

(51) Int. Cl.[7] .................................................. H05B 3/00
(52) U.S. Cl. ........................... 29/611; 29/619; 29/621; 29/843; 29/860; 219/341; 228/248.1; 338/309; 338/327
(58) Field of Search ........................ 29/611, 619, 620, 29/621, 640, 843, 860; 228/248.1, 254, 256, 260, 261, 262, 215; 427/372.2, 383.1, 421, 430.1; 388/309, 329, 327; 219/538, 541

(56) References Cited

U.S. PATENT DOCUMENTS

| | | | |
|---|---|---|---|
| 3,378,526 A | | 12/1973 | Damron |
| 4,183,136 A | * | 1/1980 | Colla ........................... 29/620 |
| 4,268,241 A | | 5/1981 | Rees et al. |
| 4,306,217 A | * | 12/1981 | Solow ........................... 29/613 |
| 4,373,132 A | | 2/1983 | Vartanian |
| 4,386,262 A | | 5/1983 | Gellert |
| 4,438,064 A | | 3/1984 | Tsutsumi |
| 4,492,556 A | | 1/1985 | Crandell |
| 4,514,160 A | | 4/1985 | Davidsmeyer |
| 4,576,567 A | | 3/1986 | Gellert |
| 4,728,534 A | | 3/1988 | Ho et al. |
| 4,777,351 A | | 10/1988 | Batliwalla et al. |
| 4,803,345 A | * | 2/1989 | Hoshizaki et al. .......... 219/202 |
| 4,837,925 A | | 6/1989 | Gellert |
| 4,870,746 A | | 10/1989 | Klaser |
| 5,084,691 A | | 1/1992 | Lester et al. |
| 5,111,025 A | | 5/1992 | Barma et al. |
| 5,225,211 A | | 7/1993 | Imaida et al. |
| 5,312,241 A | | 5/1994 | Günther |
| 5,411,392 A | | 5/1995 | Von Buren |
| 5,429,491 A | | 7/1995 | Gellert |
| 5,429,657 A | * | 7/1995 | Glicksman et al. ............ 75/351 |
| 5,492,653 A | * | 2/1996 | Hochheimer et al. ...... 106/1.14 |
| 5,519,191 A | | 5/1996 | Ketcham et al. |
| 5,558,888 A | | 9/1996 | Beck |
| 5,614,233 A | | 3/1997 | Gellert |
| 5,645,874 A | | 7/1997 | Osuna-Diaz |
| 5,766,516 A | | 6/1998 | Fukuta et al. |
| 5,781,402 A | * | 7/1998 | Fujiyama et al. ........... 361/305 |
| 5,855,820 A | | 1/1999 | Chan et al. |
| 6,222,166 B1 | * | 4/2001 | Lin et al. .................... 219/538 |

\* cited by examiner

Primary Examiner—Carl J. Arbes
Assistant Examiner—Donghai D. Nguyen
(74) Attorney, Agent, or Firm—Blumenfeld, Kaplan and Sandweiss

(57) ABSTRACT

A power adapter is shown for use on injection molding runner nozzles. The power adapter provides for quick and easy installation (and removal) of thick film resistance heaters on the runner nozzles, without the need for rewiring. The power adapter comprises a series of rings that allow insertion of the terminal end of the heater, which is then rotated into a locked position. One of the rings contains contacts which are at least semi-permanently wired to a power source. To facilitate the power adapter, a novel method terminating the heating element is used. A noble-metal-based bonding agent (such a silver-base ink) is applied to the heating element and/or terminal plate. The terminal plate is then affixed to the heating element and the bonding agent is fired.

30 Claims, 6 Drawing Sheets

TERMINATION METHOD FOR THICK FILM RESISTANCE HEATER

FIELD OF THE INVENTION

The present invention relates to resistance heaters and more specifically to a power adapter for resistance heaters used on injection molding runner nozzles and to a method of termination that allows said power adapters to be used for thick film resistance heaters.

BACKGROUND OF THE INVENTION

It is well-known in the plastics industry to mold thermoplastics with hot runner systems. In this system, melted thermoplastics ("melt") is run through a series of channels and through a series of nozzles before being injected into a mold. The nozzles protrude from a manifold, which houses the melt channels. A pair of complementing mold platens together form a mold cavity into which the nozzles empty the melt.

The importance of keeping the nozzles heated to prevent the melt from freezing before entering the mold cavity is also well-known. Originally, resistive element heaters were integrally designed with the nozzles. However, the heating elements of these heaters had shorter life spans than the nozzles, so it was unnecessarily expensive to replace the entire nozzle when the heating element failed.

To overcome this expense, heaters were built separate from the nozzle. For example, cable heaters would be embedded in or assembled with a band or ring that would clamp or slide over the nozzle. More recently it has been proposed by Watlow Electric Manufacturing Company of St. Louis, Mo., to place a thick film resistive heating element on a metal substrate that could be slid over a nozzle. Obviously, if the substrate is metal, a dielectric layer must also be introduced between the heating element and the substrate. This is typically done by a spraying, printing, or dipping method, or any other similar method, all of which are well-known and equivalent alternatives to one of ordinary skill in the art of thick film technology.

The major limitation, even with the separate heaters, is that changing the heater requires significant down time. The heaters are wired into the molding system, which has wiring channels embedded in the manifold. Therefore, replacing the heater means accessing the wiring channels, which in turn means a significant down time for a heater change.

The other limitation related specifically to the thick film heaters is that there was no easy way to terminate leads on the end of the heating elements. Power leads on thick film heaters have been typically soldered to the heating element. The limitation here is that solder melts at 190° C. so the application temperature is limited to approximately 125° C., which is insufficient for a hot runner system.

It is also known to use mechanical terminations with a thick film heater where a ring with an insulator (such as mica) is clamped over the leads to mechanically hold them in place against the heating element. There are many disadvantages to this type of assembly. For example, the assembly is bulky, cumbersome, complex, and expensive. Even worse, however, the additional space taken by this assembly creates a thermal mass, which can increase temperature variations of the heater.

SUMMARY OF THE INVENTION

Accordingly, it is an object of the present invention to overcome the disadvantages of the prior art by providing an electrical adapter to provide power to a nozzle heater for a hot runner molding system.

It is another object of the present invention to provide such an adapter that allows for quick and easy removal and replacement of a failed heater.

It is yet another object of the present invention to provide such an adapter to work with a heater that uses a thick film heating element.

It is still another object of the present invention to provide a new termination of thick film heating elements that can withstand high temperatures.

It is still further an object of the present invention to provide such a termination of thick film heating elements that is compact, yet durable.

In keeping with the above enumerated objects, the present invention provides a power adapter that is permanently (or semi-permanently) installed in an injection molding system. The power adapter allows insertion of a heater and has a mechanism to retain the heater by rotating the heater into a locked position. Conversely, the heater may be removed, upon failure for instance, simply by rotating the heater in the opposite direction (to unlock it from the retaining mechanism) and pulling the heater off the nozzle.

In a hot runner system the nozzles are kept hotter than the mold. In a cold runner system (a similar "runnerless" injection molding system) the nozzles may be heated, but not to as a high a degree as the mold. The present system was designed for hot runner systems, but works equally well with cold runner systems without departing from the objects of the invention.

In another aspect of the invention electrical contacts are embedded in the adapter to provide power to the heater. The contacts are preferably pliant and are electrically hard-wired through the wiring channels of the manifold.

In yet another aspect of the present invention, a thick film heater is provided with terminal plates that are designed to engage the contacts located inside the power adapter. The preferred heater is a thick film heating element deposited on a metal substrate. A novel method is used to affix the terminal plates to the end of the thick film heating element, which involves using a conductive silver-based paste as an adhesive between the terminal pad and the heating element. This termination method, which makes the present invention practical can be used in a variety of other applications unrelated to the power adapter.

BRIEF DESCRIPTION OF THE DRAWINGS

So that the manner in which the above-identified features, advantages, and objects of the present invention are attained and can be understood in detail, a more particular description of the invention, briefly summarized above, may be had by reference to the embodiment thereof which is illustrated in the appended drawings.

It is noted however, that the appended drawings illustrate only a typical embodiment of this invention and is therefore not to be considered limiting of its scope, for the invention may admit to other equally effective embodiments. Reference the appended drawings, wherein.

DETAILED DESCRIPTION OF THE DRAWINGS

Figure 1:
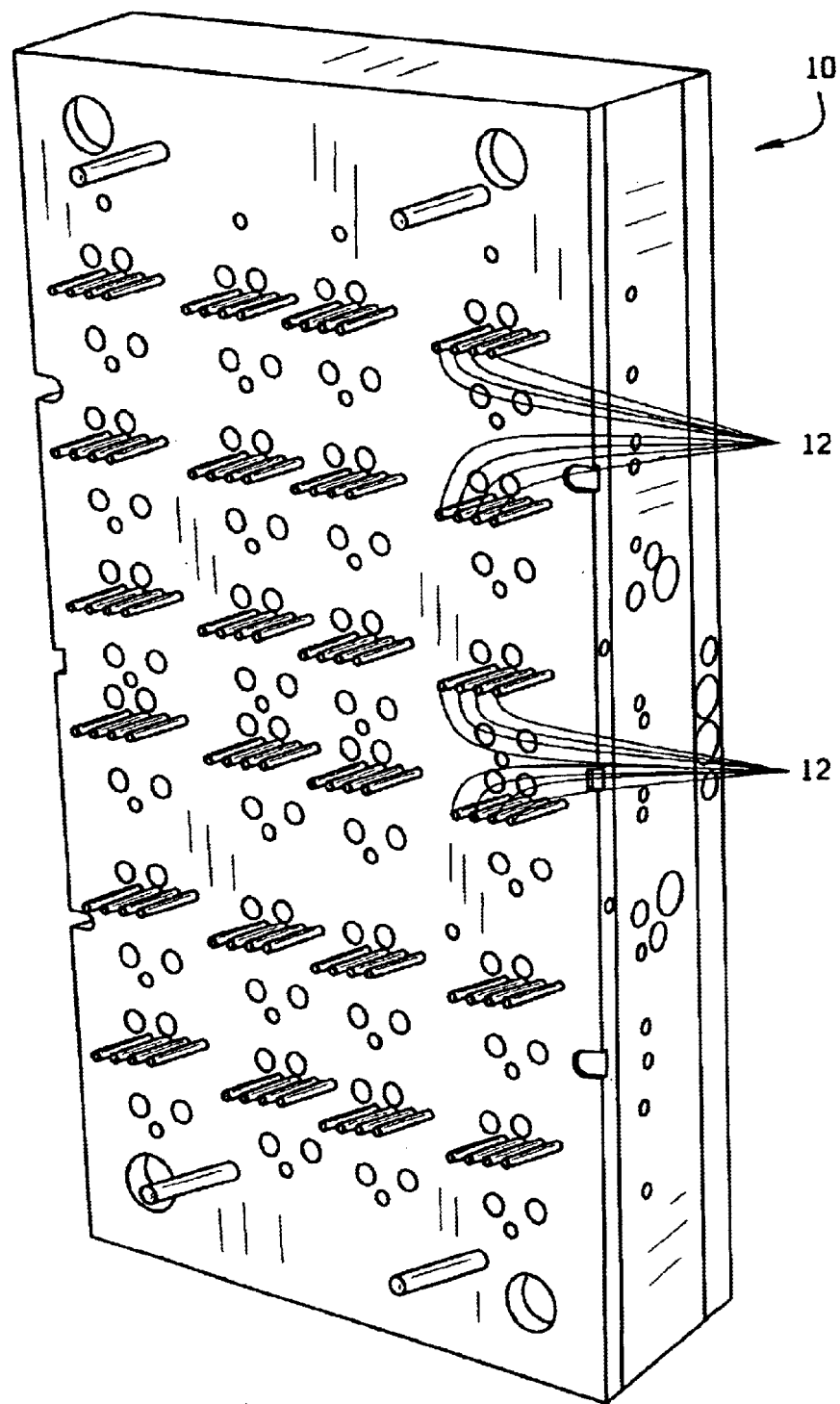
FIG. 1 is an isometric view of a hot runner injection molding system, upon which the present is utilized.

Referring now to FIG. 1, a hot runner injection molding system 10 is shown generally. The molding system 10 has a plurality of nozzles 12 to inject molten plastics ("melt") into mold cavities. Each nozzle 12 must be heated to prevent the melt from freezing therein.

Figure 2:
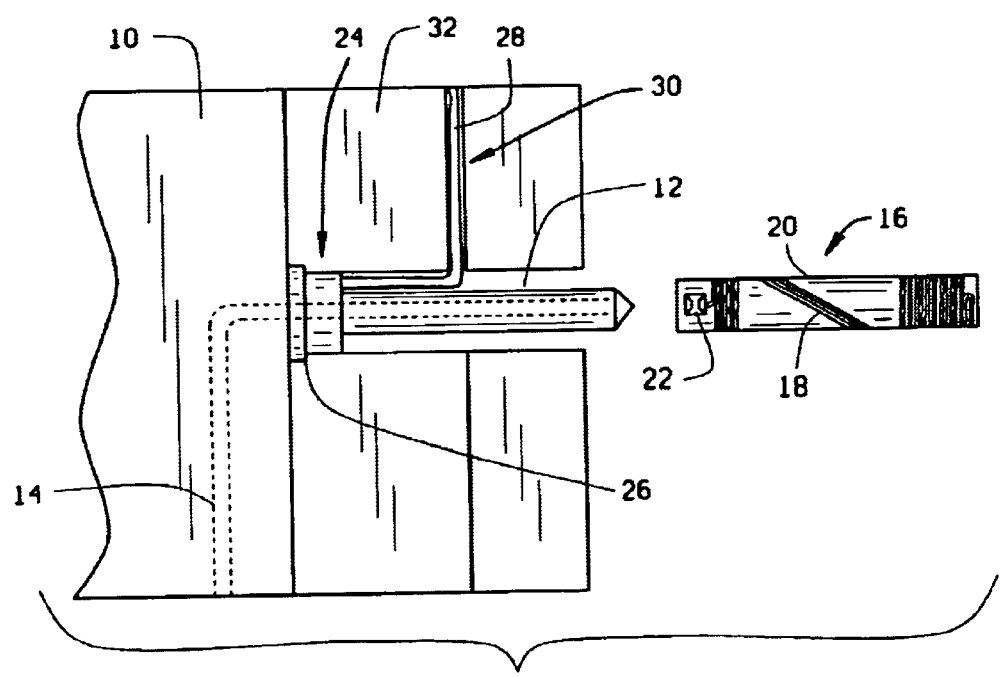
FIG. 2 is a side view detail of the injection molding system and accompanying nozzle of FIG. 1 in operational relationship to the present invention.
Figure 3:
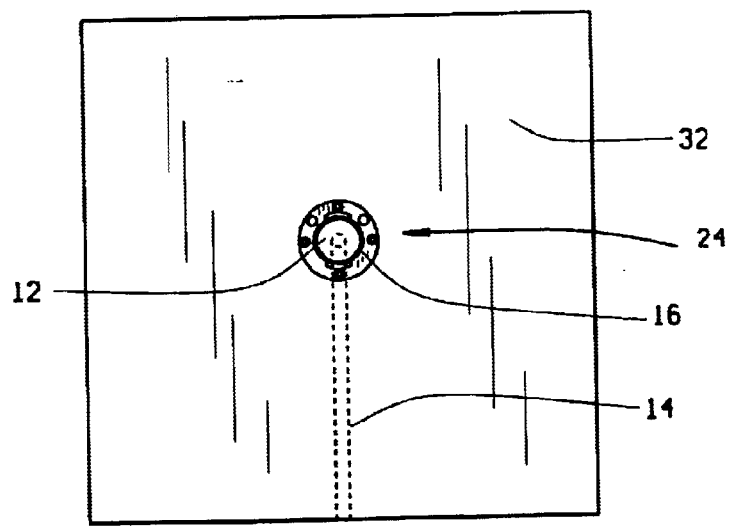
FIG. 3 is an end view of the system of FIG. 2 without the nozzle heater.

FIGS. 2 and 3 show a detail of one nozzle 12. The melt channel 14 runs through the molding system 10 and into the nozzle 12. A heater 16 is adapted to surround the nozzle 12 to keep the nozzle 12 heated during operation. The preferred embodiment of the heater 16 is a thick film resistive heating element 18 disposed on a substrate 20. The substrate 20 is typically metal, however other materials may be used. If a metal substrate 20 is used, as is conventional, a dielectric layer (not shown) must first be applied by spraying, printing, or any other equivalent method, all of which are well-known in the art of thick film technology. The heating element 18 has a pair of termination pads 22, located on the substrate 20. The termination pads 22 are typically, but not necessarily, diametrically opposed on the substrate 20.

When the heater 16 is placed on the nozzle 12, the termination pads 22 engage the power adapter 24, which is shown in further detail below. The power adapter 24 may be permanently or semi-permanently affixed either directly to the molding system 10 or indirectly by way of a flange 26 on the base of the nozzle 12.

The power adapter 24 allows for quick and easy removal, insertion, and replacement of the heater 16. Instead of rewiring a new heater 16 each time replacement becomes necessary, the power adapter 24 remains wired to a power source through conventional power leads 28 and wiring channel 30 in either the molding system 10 or mold platen 32.

The preferred power adapter 24 consists of multiple layers: a distal layer 34 (relative to the molding system 10), a proximal layer 36, and one or more intermediate layers 38. The preferred distal layer 34 has a central bore 40, which has an inside diameter approximating that of the outside diameter of the heater 16, of course with some additional room for tolerances. The bore 40 on the distal layer 34 will also have a pair of recesses or notches 42 approximating the cross-sectional shape of the terminal plates 22. Thus, it should be readily seen that the end of the heater 16 with the terminal plates 22 will only pass through the bore 40 of the distal layer 34 when the terminal plates 22 are aligned with the notches 42.

Figure 4:
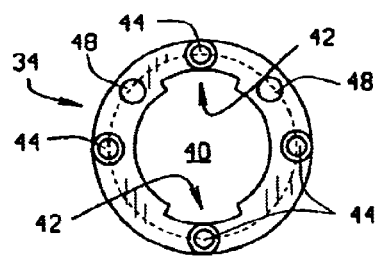
FIG. 4 is a top view of an outer layer of the power adapter of the present invention.
Figure 5:
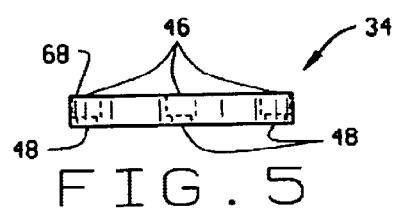
FIG. 5 is a side view of the outer layer of FIG. 4.

Referring now to FIGS. 4 and 5, the distal layer 34 should also have a plurality of retaining bores 44, for placing retaining mechanisms such as screws or bolts (not shown) therethrough. As may be seen in FIG. 5, these retaining bores, may have small counter bores 46 to accommodate screw or bolt heads. The preferred embodiment also has a pair of wiring bores 48 for passing power leads 28 therethrough. It should be noted that while the preferred embodiment routes the power leads 28 through the front face of the distal layer 34 of the power adapter 24, the power leads 28 may be routed from the contacts 50 directly out the side or rear of the power adapter 24 without departing from the scope of the invention.

Figure 6:
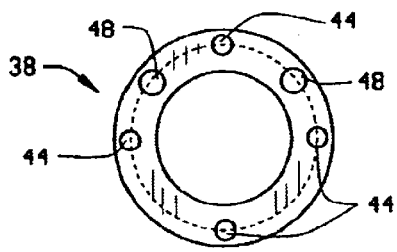
FIG. 6 is a top view of an intermediate layer of the power adapter of the present invention.
Figure 7:
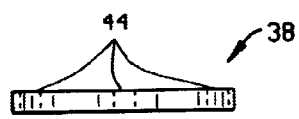
FIG. 7 is a side view of the intermediate layer of FIG. 6.

As seen in FIGS. 6 and 7, the intermediate layer(s) 38 should have a central bore 52 that lines up concentrically with the central bore 40 of the distal layer 34. The central bore 52, if it does not have notches similar to notches 42 of the distal layer, should be large enough (as measured by the inside diameter) to accommodate not only the heater 16, but the termination plates 22, as well. Retaining bores 44 and wiring bores 48 should continue through the intermediate layer(s) 38, however if multiple intermediate layers 38 are used, intermediate layers 38 closer to the proximal layer 36 may have narrower wiring bores 48 sized to accommodate only the conducting element of the power leads 28 as opposed to the insulation therearound.

Figure 8:
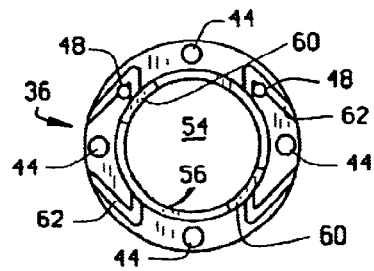
FIG. 8 is a top view of an inner layer of the power adapter of the present invention.
Figure 9:
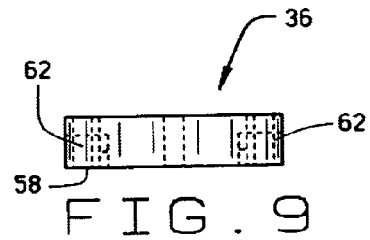
FIG. 9 is a side view of the inner layer of FIG. 8.

The proximal layer 36, shown in FIGS. 8 and 9, should have a central bore 54 with a lip 56 at or near the bottom 58 of the proximal layer 36—that is the end that is closest to the molding system 10 when installed. The lip 56 should be sized so that the nozzle 12 may pass completely through the bore 54, but the substrate 20 of the heater 16 may enter into the bore 54 only as far as the lip 56. Thus the lip 56 acts as an axial stop to the heater substrate 20. Additionally, the inside wall of bore 54 should have at least one, and preferably two radial stops 60 protruding therefrom. The radial stops 60 may optionally be integrated with the lip 56. The radial stops 60 are adapted to engage the termination plates 22 as a heater 16, fully inserted into the adapter 24, is rotated to prevent further rotation. The proximal layer 36 will also have continuations of the wring bores 48 and the retaining bores 44. In the proximal layer 36, however, the retaining bores 44 are preferably threaded and possibly narrower than in the other layers for purposes of carrying out their retaining function.

Figure 10:
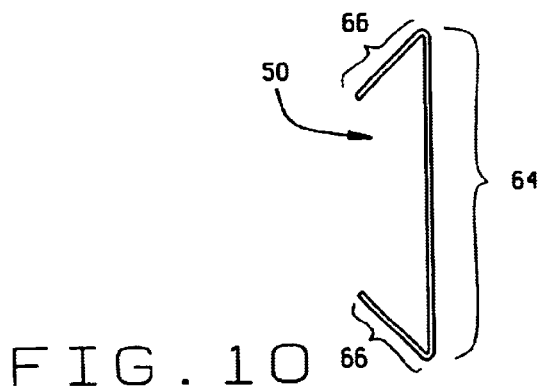
FIG. 10 is a top view of a contact of the power adapter of the present invention.
Figure 11:
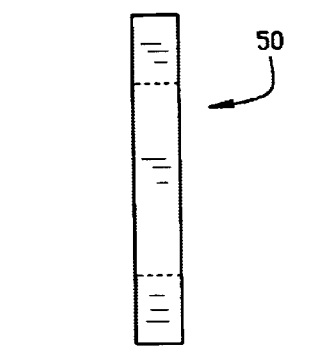
FIG. 11 is a side view of the contact of FIG. 10.
Figure 12:
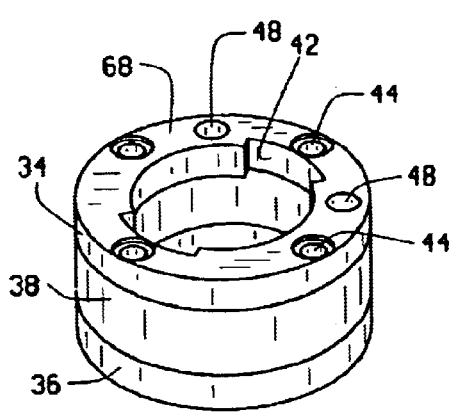
FIG. 12 is an isometric view of the power adapter of the present invention.
Figure 13:
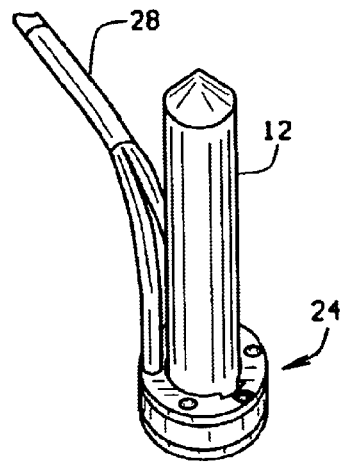
FIG. 13 is an isometric view of the power adapter of FIG. 12 in an operational position around a nozzle and with accompanying power leads.

Furthermore, the proximal layer 36 should have a pair of channels 62 in which contacts 50 are embedded; however more than two may be used if a particular heater embodiment requires more than two leads due, for instance, to a 3-phase design or an integrated sensor. The channels 62 (and thus the contacts 50) should be positioned in relation to the radial stops 60 (or vice versa) such that a fully rotated heater 16 will have its termination plates 22 abutting the contacts 50. Thus it should also be seen that it is desirable to have the channels 62 and contacts 50 intersect with the central bore 54 of the proximal layer 36. For this same reason, the contacts 50 should be somewhat pliant. This can be accomplished either through materials selection or appropriate dimensioning of the contacts 50 so that it is sufficiently slender. The inventor has found that many materials are well suited for the contact 50, but that the preferred material for this purpose is Inconel®. This pliant character of the contacts 50 allows the contacts 50 to: a) give way to the termination plates 22 as the heater 16 is rotated; b) maintain a constant electrical connection between the contacts 50 and the termination plates 22 (and thus the lead wires 28 and the heating element 18); and c) provide some mechanical resistance to the rotation of the heater to prevent accidental disengagement of the heater 16 with the adapter 24. To accomplish the desired characteristics, a typical contact 50 is shown in FIGS. 10 and 11. The typical contact 50 consists of a main section 64 and a pair of outer sections 66, which are bent back to retain the contact 50 in its channel 62 and to provide a spring effect.

With the contacts 50 in place, the lead wires 28 can be indefinitely affixed to the contacts 50 using any conventional method such as welding, soldering, or mechanical. The lead wires 28 are then run to a point outside the adapter 24 where they are connected to a power source. The lead wires 28 may be routed outside the adapter 24 directly through the side of the proximal layer 36, or as is done in the embodiment shown, through wiring bores 48 and out the top surface 68 of the distal layer 34. Hence a primary objective of the invention is achieved in that the heater 16 can be replaced without disturbing the lead wires 28 or their connections to the contacts 50.

In operation of the preferred embodiment, the heater 16 is slid over nozzle 12 with the termination plates 22 aligned with notches 42 to clear the distal layer 34 of the power adapter 24. The heater 16 continues to be slid over the nozzle 12 until it is stopped by contact between its substrate 20 and the lip 56 of the proximal layer 36. Radial stops 60 prevent the termination plates 22, and thus the heater 16, from being rotated counterclockwise. It is important to note that the directions given are by convention only, and that exchanging the locking and unlocking directions of rotation is possible and certainly within the scope of the present invention. The user rotates the heater 16 clockwise until the termination plates 22 engage the electrical contacts 50, at which point the radial stops 60 prevent further clockwise rotation. Pressure applied by the pliant contacts 50 helps reduce the chances of accidental rotation of the heater 16 due to vibrations, shock, etc. When one desires to replace the heater 16, for instance due to a failure, the heater 16 is replaced by rotating it counterclockwise until further rotation is prevented by the termination plates 22 contacting the radial stops 60, at which point the termination plates 22 will again be aligned with notches 42. The heater 16 is then pulled off of the nozzle 12 and replaced by repeating the above steps.

Figure 14:
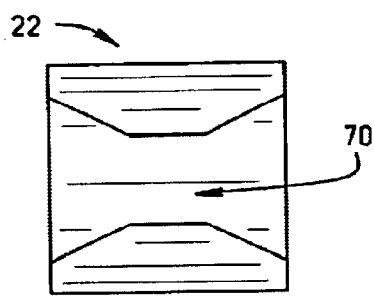
FIG. 14 is a detailed top view of a termination pad of the present invention.
Figure 16:
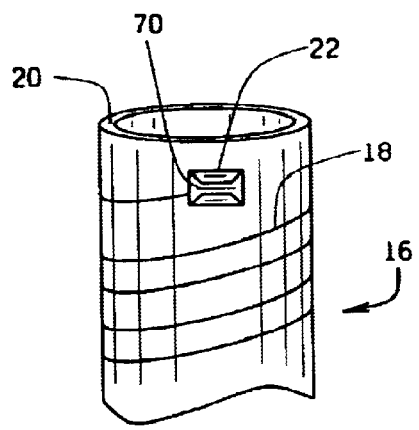
FIG. 16 is an isometric view of a termination pad affixed to the end of a thick film heating element on a nozzle heater.
Figure 15:
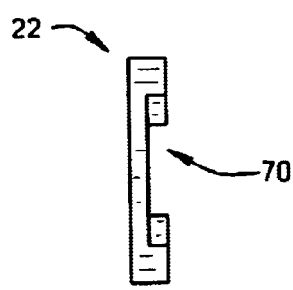
FIG. 15 is a detailed end view of the termination pad of FIG. 14.

The terminal plate 22 can be seen in detail in FIGS. 14 and 15. It is a relatively small metal plate (for example about 0.1 square inches in frontal surface area for a heating element 18 rated for 5 amps). The preferred embodiment of terminal plate 22 has an hourglass-shaped groove 70 in the middle to receive contact 50. The neck of the groove 70 should be only slightly wider than contact 50. The terminal plate 22 may also have a slight curvature to match that of the heater 16 substrate 20.

Conventional methods to hold the terminal plate 22 to the substrate 20 will produce less than desirable results. It should be reiterated that if a metal substrate 20 is used, a thin dielectric layer is needed between the substrate 20 and the heating element 18 or terminal plate 22 (which preferably rests directly on top of the heating element 18). This dielectric layer may be sprayed or printed on the substrate 20 or applied using any equivalent method, many of which are well-known. The preferred embodiment uses a novel attachment method for the terminal plate 22. A noble-metal-based conductive adhesive 72 is used to bond the terminal plate 22 (typically made of a stainless steel) directly to the end of the thick film heating element 18. It is important that the metal base in the adhesive is both conductive and non-reactive in air. The inventor has found that silver-based adhesives work particularly well.

The adhesive 72 should have high melting temperature—preferably 900° C. or greater. The adhesive 72 is applied directly to the heating element 18 at a section near the end thereof designated as the terminal pad 74. Alternatively, the adhesive 72 may be just as easily applied to the terminal plate 22 itself or both the terminal plate 22 and terminal pad 74. The terminal pad 74 is simply the end section of the thick film heating element 18 not covered with a dielectric material 76 as the remaining portions of the heating element 18 are. As mentioned above, a dielectric base 78 remains between the entire heating element 18 (including the terminal pad 74) and the substrate 20 as an insulator if a typical metal substrate 20 is utilized.

Figure 17:
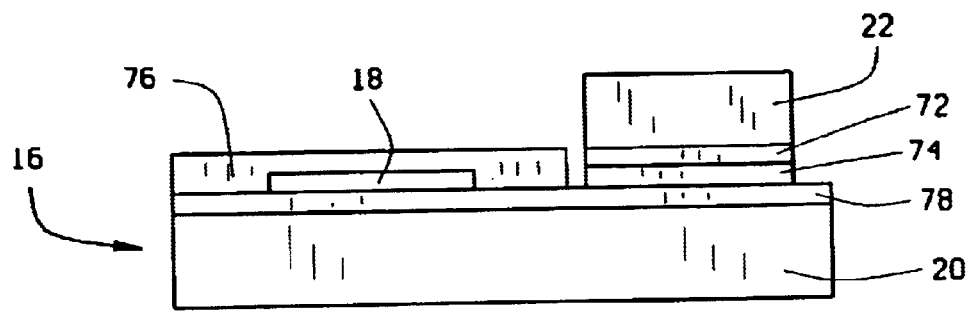
FIG. 17 is a close-up side view of the termination pad and thick film heater of FIG. 16.

The preferred embodiment, which is detailed in FIG. 17, uses a layer of adhesive 72 that is approximately 100 microns thick once dried. By way of example, the heater shown in FIG. 17 may be terminated using the present method by brushing a silver alloy paste (the adhesive 72) on the terminal pad 74, and placing the terminal plate 22 thereon while the adhesive 72 is still wet. The assembly is dried in a convection oven at 150° C. for 30 to 60 minutes to remove any solvent from the adhesive 72 and form a bond between the terminal pad 74 and terminal plate 22. The adhesive 72 is further sintered by firing in an electric furnace for 5 to 30 minutes at a temperature somewhere between 700° C. and 900° C.

The resulting heater can operate in temperatures of at least up to 500° C. The bond is strong enough that a force of at least 7 pounds (150 N) perpendicular to the terminal plate 22 surface or at least 23 pounds (500 N) parallel to the terminal plate is required to break it. This is obviously an excellent bond strength considering the terminal plate used measures 0.375"×0.25". The resulting bond also produced a mere 0.1 ohms of resistance, which is negligible compared to the resistance of the heating element 18.

Figure 18:
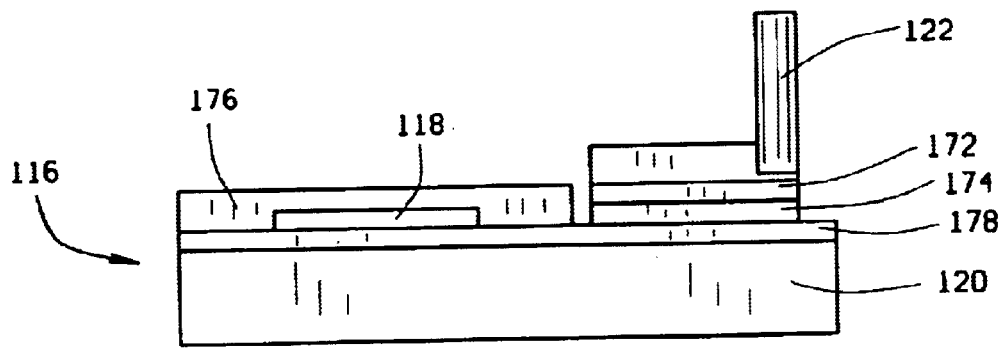
FIG. 18 is a close-up side view of an alternate termination configuration using the termination method of the present invention.
Figure 19:
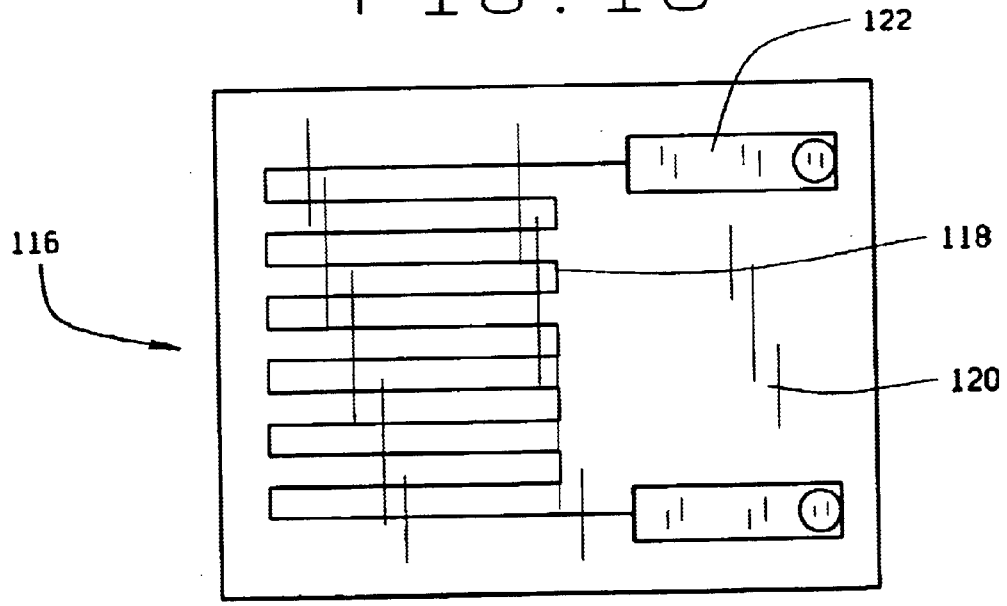
FIG. 19 is a top view of the thick film heater and termination of FIG. 18.
Figure 20:
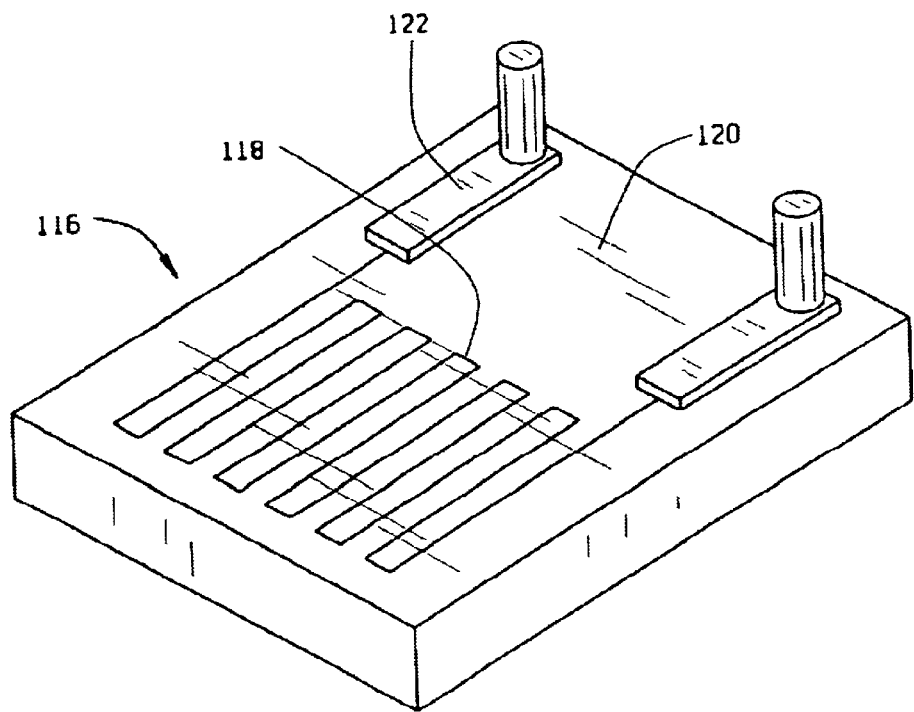
FIG. 20 is an isometric view of the thick film heater and termination of FIG. 18.

Instead of using the present power adapter 24, it is also possible to weld power leads directly to the terminal plate 22. It is also possible to terminate thick film heaters with terminators other than the terminal plate 22 designed for the power adapter 24. For instance, FIGS. 18-20 (not drawn to scale) show a thick film heater 116 with a flat substrate 120. The heating element 118 is surrounded by a dielectric base layer 178 and dielectric outer cover 176 just as in FIG. 17. The heating element 118 ends in an uncovered terminal pad 174. Instead of placing a terminal plate 22 on the adhesive 172, an L-shaped metal plate 122 is used in its place.

Figure 21:
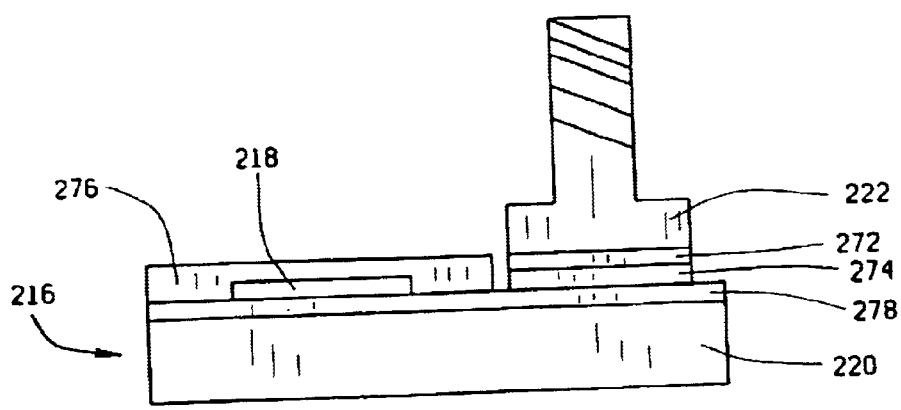
FIG. 21 is a close-up side view of another alternate termination configuration using the termination method of the present invention.

In another alternative embodiment heater 216, shown in FIG. 21, a substrate 220 has a thick film heating element 2.18 on a dielectric base coating 278 and a dielectric over coating 276. The heating element 218 ends in an uncoated terminal pad 274 which is then covered with the adhesive 272 and a threaded bolt 222. Power conductors ("leads)(not shown) can then be attached to the threaded bolt 222 either by welding or by any mechanical retention means.

It should be noted that it is also possible to coat any embodiment of the terminal plates or their alternatives with a dielectric coating for insulation. For example, the terminal plate 22 with wires already affixed can be coated with a dielectric paste similar to that used for dielectric layers 76, 78 surrounding the heating element 18. The layer may then either be sandblasted off after a firing to bake out any solvents or the paste can be wiped off before firing. Various types of protective layers may be used in this way, such as glass insulation, polymers, or ceramics.

Many bonding agents are suitable for this termination method. The bonding agent must be highly conductive, have a high melting point, form a strong adhesive bond, and must not break down quickly when exposed to heat. These requirements are generally satisfied by using a silver-based bonding agent, however bonding agents based on other noble-metals (gold for example) should also work. Some silver-based bonding agents have been discovered to produce somewhat better or worse results than others. In particular, it has been found that a silver-based alloy sold as ESL9562 by Electro-Science Laboratories, Inc., of King of Prussia, Pa., works very well, as does a silver-based alloy with glass frit sold as ESL590 (also from Electro-Science Laboratories, Inc.). A silver and palladium alloy has also produced very positive results.

Additionally, several methods of applying the bonding-agent to the terminal pad or terminal plate may be utilized. Although a brushing method has been found to be the preferred embodiment for use with the small and curved terminal plates designed for the present power adapter, silk screen printing, spray coating, dipping, greet tape, and direct writing have all been found to be effective, depending on the particular nature of an application. One of ordinary skill in thick film heater manufacture should readily be able to determine which adhesive application method is most suited for a particular design.

One other variable that effects bond strength seems to be firing temperature of the termination assembly after the terminal plate (and necessarily the bonding agent) have been placed on the terminal pad. Although limited data is available at this time, it has been found that 700° C. to 900° C. appears to be ideal with only moderate deviations of results within that range.

While the foregoing is directed to the preferred embodiments of the present invention, other and future embodiments of the invention may be devised without departing from the basic scope thereof, and the scope thereof is determined by the claims which follow.

We claim:

1. A method of terminating a thick film heater comprising the steps of:
   providing a heater and a plurality of terminal plates, the heater having at least one thick film resistive heating element, each heating element having two end portions adapted to contact the terminal plates;
   applying a conductive noble-metal-based bonding agent to a contact surface between the terminal plates and the end portions of the heating element; and
   affixing one of said terminal plates to each end portion of the heating element, the bonding agent being disposed therebetween, wherein the terminal plates are adapted to receive power for the heating element from an external power source.

2. The method of claim 1, wherein the noble-metal-based bonding agent is silver-based.

3. The method of claim 1, further comprising the step of attaching a power conductor to each terminal plate.

4. The method of claim 3, wherein the power conductors are attached by welding.

5. The method of claim 3, wherein the power conductors are attached by soldering.

6. The method of claim 3 further comprising a final step of shielding the terminal plates and a portion of the power conductor with a protective layer.

7. The method of claim 6, wherein the protective layer comprises glass insulation.

8. The method of claim 6, wherein the protective layer comprises a polymer.

9. The method of claim 6, wherein the protective layer comprises a ceramic.

10. The method of claim 3, wherein the power conductors are attached by brazing.

11. The method of claim 1, wherein the terminal plates are threaded studs.

12. The method of claim 1, wherein the terminal plates are "L" shaped.

13. The method of claim 2, wherein the bonding agent consists of an ink comprised primarily of a silver alloy.

14. The method of claim 13, wherein the bonding agent further comprises a glass frit.

15. The method of claim 1, wherein the bonding agent comprises a silver-palladium alloy.

16. The method of 15, wherein the bonding agent consists of an ink comprised primarily of a silver alloy.

17. The method of claim 15, wherein the bonding agent further comprises a glass frit.

18. The method of claim 1, wherein the heating element is protected by a dielectric except for a portion at each end, and wherein the terminal plates are positioned to cover the unprotected portion of the heating element.

19. The method of claim 1, wherein said bonding agent has a melting point of at least 900° C.

20. The method of claim 1, wherein the bonding agent is applied by silk screen printing.

21. The method of claim 1, wherein the bonding agent is applied with a paint brush.

22. The method of claim 1, wherein the bonding agent is applied by spray coating.

23. The method of claim 1, wherein the bonding agent is applied by dipping the ends of the heating element in the bonding agent.

24. The method of claim 1, wherein the bonding agent is applied using a green tape method.

25. The method of claim 1, further comprising a final step of fining the bonding agent until the binding agent has sintered thereby forming a bond between the terminal plate and the heating element.

26. The method of claim 25, wherein the final step takes place between 700° C. and 900° C.

27. The method of claim 1, wherein the terminal plates are curved to match the curvature of a substrate of the heater.

28. The method of claim 1, wherein at least one of the heating elements is adapted for use with 3-phase power, the heating element having three end portions, each adapted to contact the terminal plate.

29. The method of claim 1, wherein the bonding agent is applied directly to the terminal plates.

30. The method of claim 1, wherein the bonding agent is applied directly to the end portion of the heating element.

* * * * *